J. O. DURER.
SHOCK TYING DEVICE.
APPLICATION FILED OCT. 27, 1910.
1,004,756.
Patented Oct. 3, 1911.
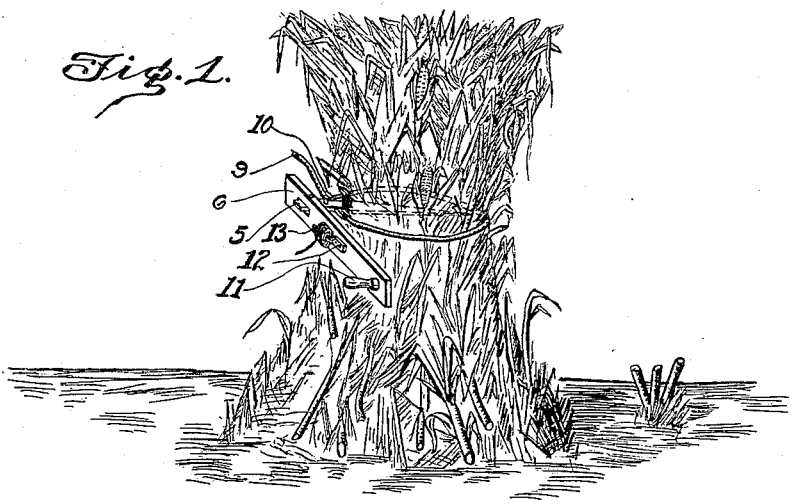
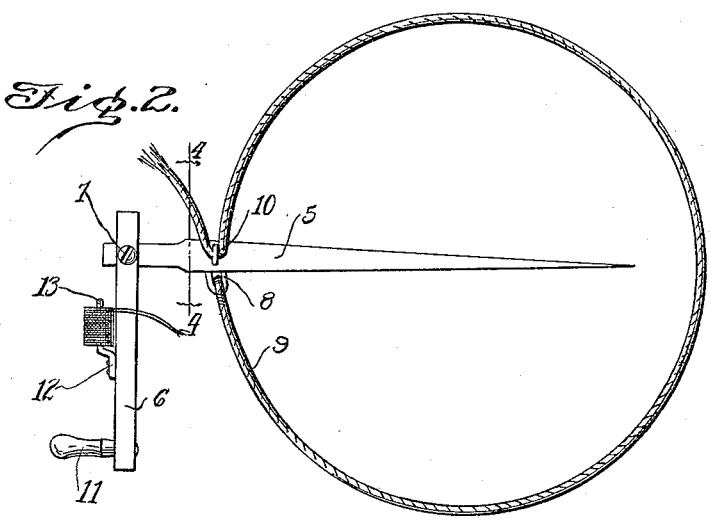
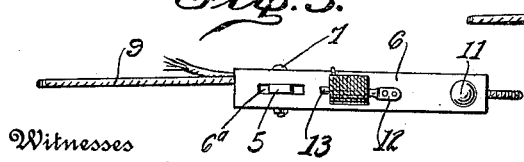
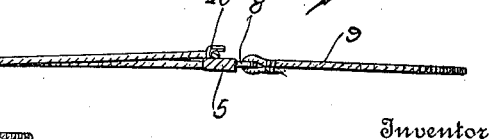
Witnesses
W. C. Fielding
Jos. J. O'Brien
Inventor
John O. Durer.
By Chandler & Chandler
Attorneys

UNITED STATES PATENT OFFICE.

JOHN OTTO DURER, OF UPPER SANDUSKY, OHIO.

SHOCK-TYING DEVICE.

1,004,756. Specification of Letters Patent. Patented Oct. 3, 1911.

Application filed October 27, 1910. Serial No. 589,413.

*To all whom it may concern:*

Be it known that I, JOHN OTTO DURER, a citizen of the United States, residing at Upper Sandusky, in the county of Wyandot, State of Ohio, have invented certain new and useful Improvements in Shock-Tying Devices; and I do hereby declare the following to be a full, clear, and exact description of the invention, such as will enable others skilled in the art to which it appertains to make and use the same.

This invention relates to improvements in shock tying devices and the leading object in view is to provide a simple device for temporarily compressing a shock whereby an operator can pass a suitable cord tie around the shock and hold it compressed, the improved device being provided with a simple twine holder.

With the above and other objects in view the invention consists in certain constructions, combinations and arrangements of parts, clearly described in the following specification and clearly illustrated in the accompanying drawings, in which:—

Figure 1 is a perspective view showing the improved device applied in position on a shock for compressing the same. Fig. 2 is a top plan view of the device removed. Fig. 3 is an end elevation thereof. Fig. 4 is a detail transverse sectional view taken on the line 4—4 of Fig. 1, looking in the direction of the arrows.

Referring to the accompanying drawings, 5 denotes a shock piercing member or rod which is suitably pointed to readily enter or pierce a shock and which has a handle or cross member 6 pivotally secured thereto by a bolt 7. The piercing member or rod 5 carries near its outer end a staple 8 in which the compressing rope or cord 9 is secured and near said staple 8 a right angular arm 10 is fastened which serves as a post for the rope or cord 9 when the operator desires to tighten said rope or cord around a shock and compress the same.

The bar 6 is provided on its outer end with a handle 11 and carries a bracket member or twine support 12 which has an offset end 13 which is adapted to be passed through the center opening in a ball of twine and which serves to hold a ball of twine for rotation on the bar 6. The bar 6 is formed with a slot $6^a$ which receives the outer end of the rod or piercing member 5. In using the device the piercing member or bar 5 is forced into a shock as shown in Fig. 1 and the compressing rod or rope 9 is passed around the shock and bent on the angular stop or bracket 10 until the shock has been sufficiently compressed. After this has been done the twine for securing the shock in a compressed condition is passed around the shock and suitably tied to hold the shock in its compressed condition.

Owing to the particular arrangement of the twine supporting bar 6 on the shock piercing rod or member 5 the twine can be effectively tightened on the shock by imparting an outward movement to the handle carrying end of the bar 6.

It is to be understood that when the twine has been passed around the shock, the portion of the twine nearest to the ball is adapted to be suitably anchored, preferably upon the angular arm 10 and the free end of the twine is attached to the handle carrying end of the bar 6, so that when the bar is swung outward upon its pivot, the said twine will be stretched and the shock thus securely held.

What is claimed is:—

A shock compressor comprising a shock piercing member provided near its outer end with an angular bracket and an eye located on said member near the bracket, a compressing cord secured at one end to the eye and adapted to be bent against the angular bracket, a bar having a slot in one end through which the outer end of the piercing member extends, a pivot extending through the slot of the bar and through the outer end of the piercing member to permit outward movement of the bar, an angular bracket mounted on the bar medially of its ends and adapted to support a twine ball and a handle secured to the outer end of the bar to permit stretching of the twine when anchored adjacent thereto.

In testimony whereof, I affix my signature in presence of two witnesses.

JOHN OTTO DURER.

Witnesses:
F. B. WILLIAMS,
WYLIE KINSLEY.

Copies of this patent may be obtained for five cents each, by addressing the "Commissioner of Patents, Washington, D. C."